United States Patent [19]

Suzuki et al.

[11] Patent Number: 4,662,908
[45] Date of Patent: May 5, 1987

[54] DEVICE FOR REMOVING BUBBLES FROM LIQUID

[75] Inventors: Ryushi Suzuki; Joji Yamaga, both of Tokyo, Japan

[73] Assignee: Ishikiwajima-Harima Jukogyo Kabushiki Kaisha, Tokyo, Japan

[21] Appl. No.: 797,798

[22] Filed: Nov. 15, 1985

Related U.S. Application Data

[63] Continuation of Ser. No. 613,771, May 24, 1984, abandoned.

[30] Foreign Application Priority Data

Jun. 1, 1983 [JP] Japan ................. 58-83054[U]

[51] Int. Cl.⁴ .................................................. B01D 19/00
[52] U.S. Cl. ..................................... 55/204; 55/459 R
[58] Field of Search ................ 55/52, 204, 205, 52, 55/459 R; 210/512.1

[56] References Cited

U.S. PATENT DOCUMENTS

| | | | |
|---|---|---|---|
| 2,507,797 | 5/1950 | Martin | 55/52 |
| 3,163,508 | 12/1964 | Tuck et al. | 55/52 |
| 3,208,229 | 9/1965 | Fulton | 55/459 R |
| 4,201,555 | 5/1980 | Tkach | 55/52 X |
| 4,410,337 | 10/1983 | Gullichsen et al. | 55/52 X |

FOREIGN PATENT DOCUMENTS

| | | | |
|---|---|---|---|
| 0534904 | 9/1931 | Fed. Rep. of Germany | 55/204 |
| 0525714 | 9/1972 | Switzerland | 55/459 R |

*Primary Examiner*—Charles Hart

[57] ABSTRACT

A liquid is introduced tangentially into a cylindrical body through a plurality of equiangularly spaced inlet ports disposed on the cylindrical body adjacent to a closed end thereof. Thus, the liquid is swirled in the cylindrical body and bubbles in the liquid are collected, by means of the centrifugal force in the swirl flow, toward the axis of the cylindrical body at the inflow side and are removed.

3 Claims, 7 Drawing Figures

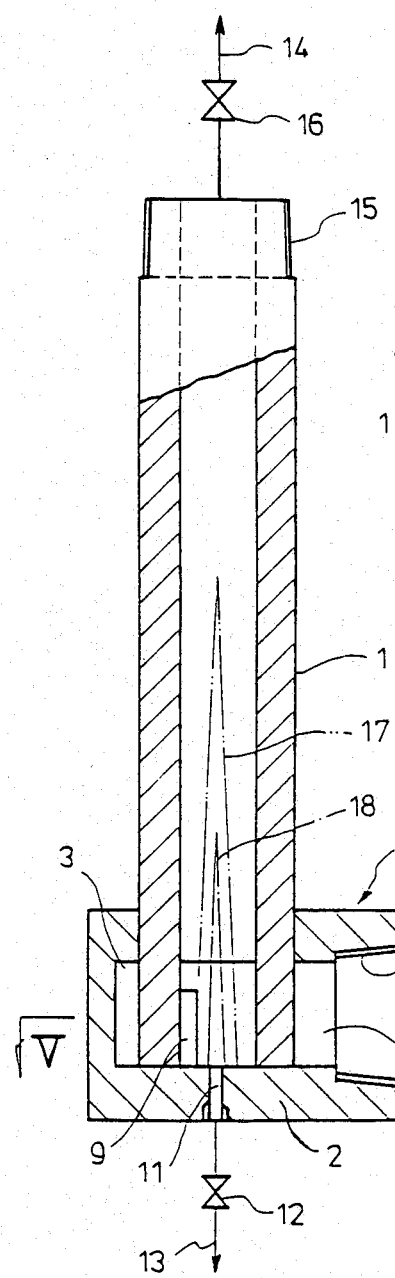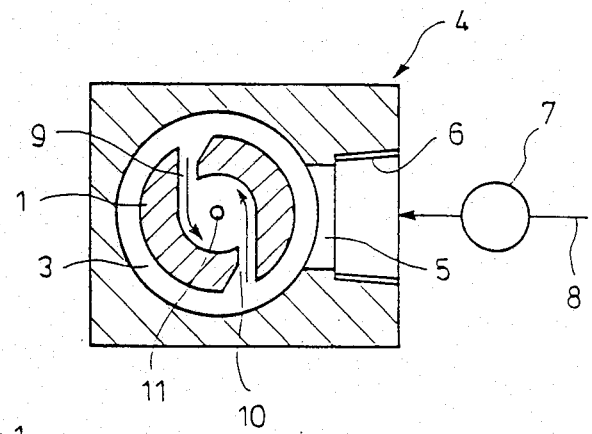
Fig. 4
Fig. 5

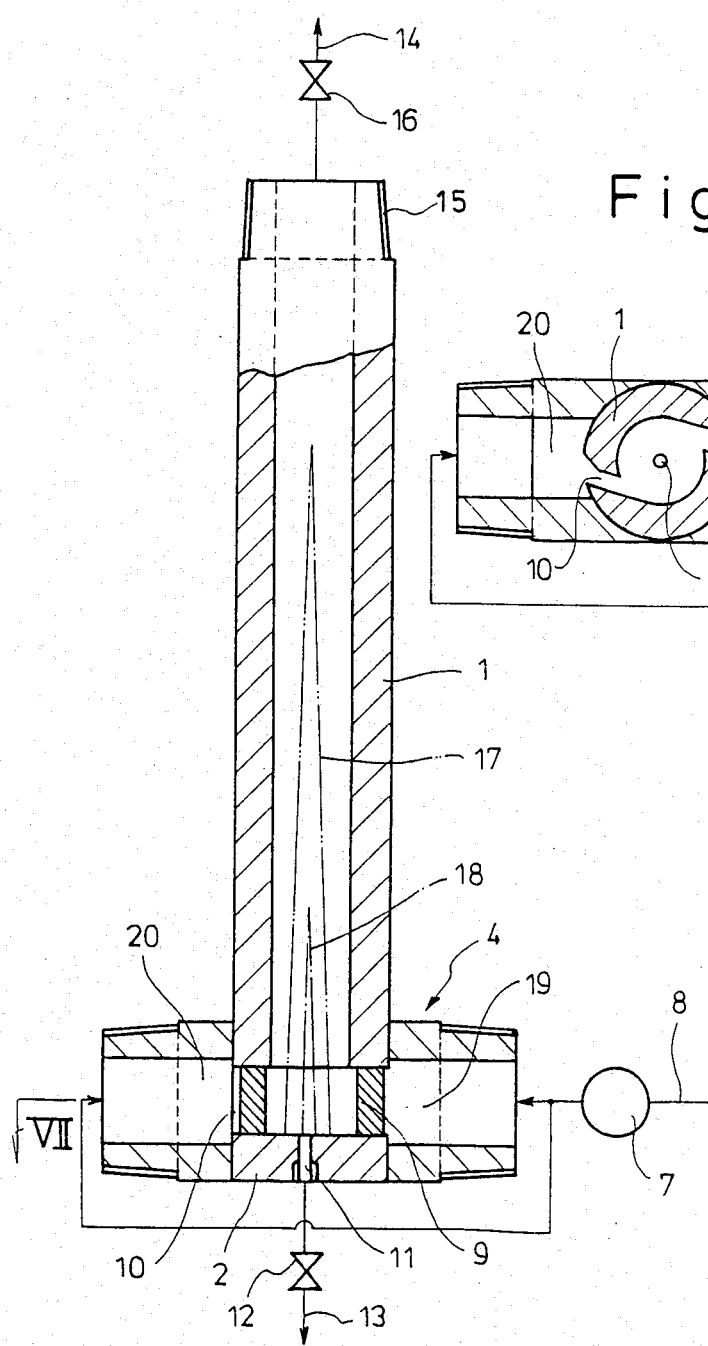
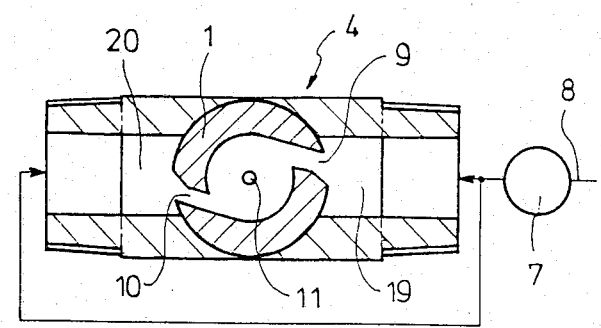
Fig. 6
Fig. 7

DEVICE FOR REMOVING BUBBLES FROM LIQUID

This application is a continuation of application Ser. No. 613,771, filed May 24, 1984 and now abandoned.

BACKGROUND OF THE INVENTION

The present invention relates to a device for removing bubbles entrained in a liquid such as industrial water (e.g. boiler water), fluids (including non-flammable fluids) used in hydraulic systems, slurries for ceramic materials, slurries used as coating solutions in papermaking machines for making coated paper, coating solutions for films and tapes, lubricants, cooling liquids for quenching, chemical solutions, liquid foodstuff, and so forth.

Bubbles entrained in a liquid of the kind described must be removed therefrom because they cause damage to equipment, increase compressivity, cause errosion due to cavitation, vibration and noise, result in poor product quality, and cause deterioration and change in quality of liquid.

There have been devices and demonstrated bubble removing methods in which the liquid is introduced into a cylinder or a coiled passage and bubbles entrained in the liquid are collected by means of the centrifugal force to the axis of the spiral flow and then are discharged.

In FIGS. 1 and 2 is shown an example of a device for practicing such method. A cylindrical body a, which is a vessel with an internal cylindrical space, is closed at its one or lower end by a lid b. An inlet port c, which is communicated with a liquid inflow pipe d, is disposed on the cylindrical body a close to the lid b such that a liquid flows into the cylindrical body a tangentially. The other end of the cylindrical body a is closed by a lid f to which is open an outlet port g which in turn is communicated with a liquid outlet pipe e. Reference letter h denotes a pump.

When a liquid with bubbles entrained therein is introduced through the inlet pipe d into the cylindrical body a, a gas column i indicated by two dot chain lines is formed depending upon the viscosity of the liquid and part of gases grow into large-sized bubbles which flow downstream. Therefore, when the outlet pipe e is connected to a tank, the large-sized bubbles float up by their own buoyancy and discharged.

This device in which large-sized bubbles are discharged downstream is advantageous in that there is no need of providing additional equipment such as an independent pipe for gas discharge or a gas suction pump. However, it has the following problems:

(i) When bubbles flow through the outlet pipe e into the tank, they collide and are finely divided again.

(ii) On the way to the liquid surface in the tank, the bubbles are sucked by a liquid suction pump and therefore flow through a system line.

(iii) The diameter of the gas column i formed within the cylindrical body a is relatively large in comparison with the inner diameter of the cylindrical body a (sometimes it becomes almost two-thirds of the inner diameter of the cylindrical body a) and the liquid flows through the annular space defined between the gas column i and the inner wall surface of the cylindrical body a. As a result, the swirl radius of the liquid is increased so that the centrifugal force exerted to fine bubbles is decreased and consequently fine bubbles are not readily collected within the gas column i. In addition, the axial velocity of the liquid flowing through the annular space becomes high so that the axial component of the fluid force is increased and consequently bubbles flow downstream without being collected into large bubbles.

In order to solve these problems, it has been also proposed that a gas vent pipe j is incorporated at the inlet side of the device shown in FIGS. 1 and 2. That is, as shown in FIG. 3, the gas vent pipe j is connected centrally to the cylindrical body a through the lid b so that the gases may be discharged through the pipe j. However, even in such device, there are the following problems:

(i) Because of the single inlet port c, the swirl center k of the liquid does not coincide with the axis of the cylindrical body a under the influence of the fluid force as shown in FIG. 2; the swirl center k is variable depending upon variation of the liquid flow rate. Thus, the gas column i is not aligned with the gas vent pipe j so that usually the gases are not discharged through the pipe j; the gases are intermittently discharged only when the diameter of the gas column i is considerably increased. As a result, the bubble removal efficiency is low.

(ii) When the liquid flow rate is increased and the swirl velocity in the cylindrical body a is increased, the pressure in the cylindrical body at its inflow side is lowered into negative pressure, resulting in failure of discharging the gas.

The above-described devices are disclosed in the co-pending U.S. patent application No. 410,826.

The present invention was made to solve the above and other problems encountered in the prior art and has its object to provide a device for removing bubbles from a liquid in which the liquid is introduced through a plurality of equiangularly spaced inlet ports into a cylindrical body so that a stable spiral flow whose center coincides with the axis of the cylindrical body can be formed, thereby effectively collecting the bubbles and in which gases are discharged through a gas vent disposed, along the axis of the cylindrical body, in a portion for closing the cylindrical body at its inflow side so that the diameter of a gas column within the cylinder can be decreased, thereby further increasing the bubble collection efficiency and enhancing the bubble removal effect.

The present invention will become more apparent from the following description of the preferred embodiments thereof taken in conjunction with the accompanying drawings.

BRIEF DESCRIPTION OF THE DRAWINGS

FIG. 4 is a longitudinal sectional view for showing a first embodiment of the present invention;

FIG. 5 is a view looking in the direction of the arrow V in FIG. 4;

FIG. 6 is a longitudinal sectional view for showing a second embodiment of the present invention; and FIG. 7 is a view looking in the direction of the arrow VII in FIG. 6.

DETAILED DESCRIPTION OF THE PREFERRED EMBODIMENTS

Figure 1:
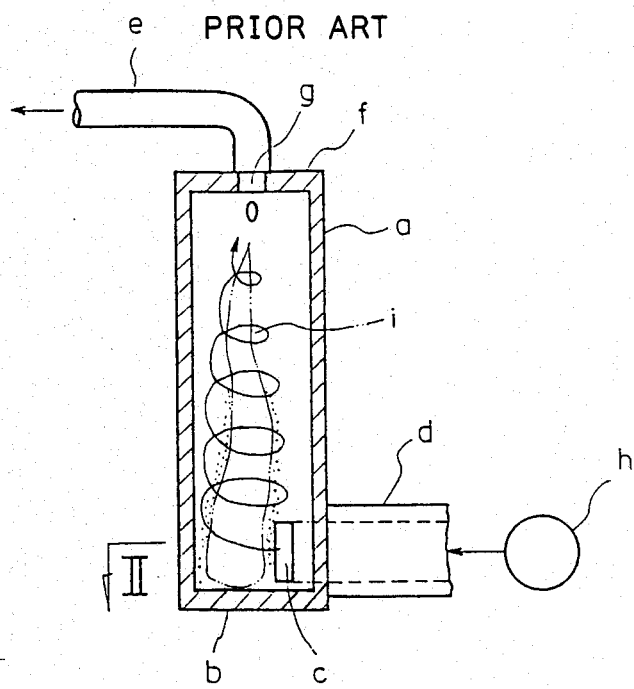
FIG. 1 is a longitudinal sectional view of a prior art bubble removal device.
Figure 2:
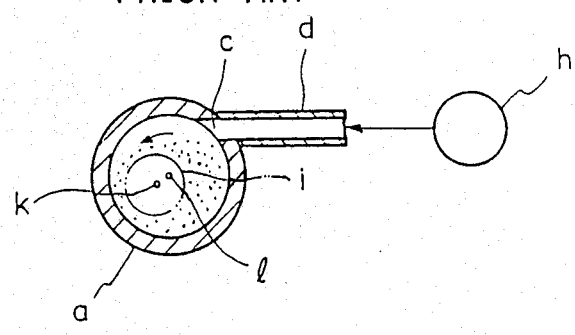
FIG. 2 is a view looking in the arrow II in FIG. 1.
Figure 3:
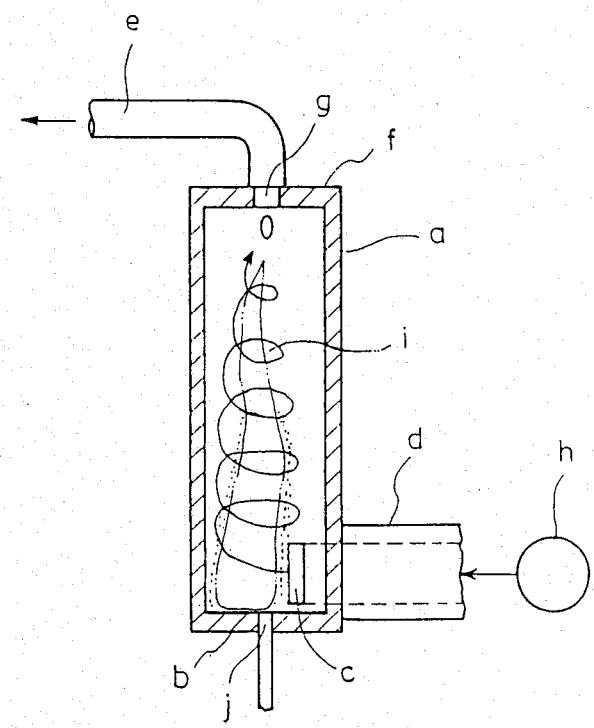
FIG. 3 is a longitudinal sectional view of another prior art bubble removal device.

FIGS. 4 and 5 show a first embodiment of the present invention. A cylindrical body 1 is provided at its one end with a liquid charging means 4 which has a portion 2 for closing the end of the cylindrical body 1 and which defines an annular passage 3 around the end of the cylindrical body 1. An inlet line 8 with a suction pump 7 is connected to a connection 6 which in turn is communicated with a supply port 5. A plurality of equiangularly spaced inlet ports 9 and 10 are formed through the cylindrical wall of the cylindrical body 1 adjacent to the closing portion 2 so that the liquid flows tangentially from the annular passage 3 into the cylindrical body 1. It goes without saying that the inlet ports 9 and 10 are so formed that the liquid discharged from the inlet ports 9 and 10 flow or swirl in the same direction. A gas vent 11 is formed through the closing portion 2 along the axis of the cylindrical body 1 and is connected to a gas vent line 13 with a gas vent valve 12. The cylindrical body 1 is provided at its other or downstream end with suitable resistance means. For example, a pressure regulator 16 such as an orifice, a throttle valve or a check valve with a suitable cracking pressure may be inserted between a discharge line 14 and connection 15 at the other end of the cylindrical body 1.

The resistance means is provided to produce some back pressure even when the discharge line 14 is short in length or when the bubble removal device is disposed within the liquid tank and has no discharge line 14; otherwise, the discharge of gases through the gas vent 11 will be prevented by the negative pressure produced at the center of the spiral flow due to the low flow back pressure within the cylindrical body 1. Therefore when the discharge line 14 is long in length or when the line 14 is connected to a liquid tank so that gases can be discharged through the gas vent 11 due to the back pressure, the pressure regulator 16 can be eliminated because the discharge line 14 or the tank itself serves as resistance means.

Next the mode of operation of the first embodiment will be described.

The liquid is charged through the inlet line 8 and the supply port 5 by the pump 7 into the annular passage 3 and is caused to flow tangentially into the cylindrical body 1 through the symmetrical inlet ports 9 and 10. The liquid moves while spiraling toward the discharge line 14. Because of a centrifugal force acting on the swirling flow, the pressure at the center of the swirling flow is low in comparison with that of the inner wall region of the cylindrcal body 1. The pressure at the center of the swirling flow is lowest in the vicinity of the inlet ports 9 and 10 and increases as the liquid flows downstream; then it reaches maximum and then decreases. Because of the pressure difference between center of the swirling flow in the vicinity of the inlet ports 9 and 10 and a downstream portion where the pressure becomes highest, bubbles entrained in the liquid are forced to return toward the inlets 9 and 10 (the lower portion). As a result, a gas column 17 is formed as indicated by two dot chain lines.

Since the inlet ports 9 and 10 are equiangularly spaced apart from each other, the spiral flow whose center coincides with the axis of the cylindrical body 1 becomes stable. That is, the center of the spiral liquid flow remains unchanged even when the flow rate of the liquid entering the cylindrical body 1 varies.

When the gas vent valve 12 is opened a little, the gases in the gas column 17 are discharged through the gas vent line 13 because the pressure in the cylindrical body 1 is higher than the atmospheric pressure. As a result, the gas column 17 becomes a gas column 18 with reduced length and diameter as indicated by one dot chain lines. Alternatively, enlarged bubbles may be directly discharged through the gas vent 11 by controlling the valve 12 so that the gas column can be eliminated. When the diameter of the gas column is decreased or when the gas column itself is eliminated, the centrifugal force exerting to fine bubbles is increased so that fine bubbles are forced to move toward the axis of the cylindrical body 1. That is, the bubble collection efficiency can be improved.

Sometimes, the pressure in the gas vent line 13 is higher than the pressure in the gas column in the cylindrical body 1 so that gases cannot be discharged. In this case, the flow rate at the downstream side is reduced by the pressure regulator 16 so that the pressure within the cylindrical body 1 is increased. Then the gases can be discharged through the gas vent 11.

FIGS. 7 and 8 show a second embodiment of the present invention. Liquid supply ports 19 and 20 are provided for the inlet ports 9 and 10, respectively, so that the annular passage 3 of the first embodiment (FIGS. 4 and 5) can be eliminated. The effects and features of the second embodiment are substantially similar to those of the first embodiment described above.

It is to be understood that the present invention is not limited to the preferred embodiments described above, that the number and shape of the inlet ports may be varied and that other various modifications may be effected without departing the true spirit of the present invention.

The effects, features and advantages of the present invention may be summarized as follows:

(I) A liquid is charged through a plurality of equiangulary spaced inlet ports into the cylindrical body so that a stable spiral flow whose center coincides with the axis of the cylindrical body can be formed. Even when the flow rate varies, the center of the spiral flow remains unchanged so that the positive and effective discharge of gases through the gas vent can be carried out.

(II) Gases are discharged through a gas vent disposed, along the axis of the cylindrical body, on a portion for closing the cylindrical body at its inflow side. As a result, the diameter of a gas column within the cylindrical body is decreased or a gas column itself is eliminated. Therefore the centrifugal force exerted to bubbles can be increased so that they can be effectively collected.

(III) Because of resistance means at the discharge side of the cylindrical body, the pressure at the gas vent can be increased. Therefore gases can be normally dicharged through the gas vent even when the pressure at the gas vent varies due to the variation in flow rate or even when the pressure head is varied.

What is claimed is:

1. A device for removing bubbles from a liquid comprising:
 a cylindrical body having a central longitudinal axis and a closed inflow end, two inlet ports communicating with said cylindrical body and being circumferentially spaced apart symmetrically about said longitudinal axis and being located adjacent to said closed end for introducing the liquid tangentially into the cylindrical body to form a spiral vortex flow near the site of entry, said liquid flow in the cylindrical body being directed axially to an outflow end of the cylindrical body, thereby causing transformation of said spiral vortex flow into an axial flow, said device further comprising fluid resistance means disposed downstream of an outlet end of said cylindrical body for providing a back pressure; and wherein the inflow velocity of said liquid is sufficient to establish a pressure in the liquid against said resistance means to cause the bubbles to resist the liquid flow and move toward said inflow end and coalesce into a coherent mass at an area about an axis of the vortex and between an area close to the point of inflow, said device further comprising a gas vent disposed along said axis of said cylindrical body at said closed end and communicating with said cylindrical body and having a diameter less than that of the cylindrical body at the site of entry to said body, said resistance means overcoming a negative pressure at a bubble coalescing area due to the swirling liquid flow to force gas out of said gas vent; and wherein said outlet end is higher than said inlet end of said cylindrical body for increasing hydrostatic pressure upon a coalesced mass of bubbles at said inlet end for urging said coalesced mass of bubbles to exit said cylindrical body via said gas vent.

2. A device according to claim 1, wherein the axis of said vortex coincides with said central axis allowing a cone shaped region of bubbles to form above an entrance to said gas vent, said gas vent extending downward from said inflow end and providing a region of pressure lower than pressure of the liquid within said cylindrical body for urging a coalesced mass of bubbles outward from the cylindrical body via said gas vent in a direction opposite to the flow of liquid, which liquid flows towards said resistance means at the downstream end of the cylindrical body.

3. A device according to claim 1, wherein a downstream end of said cylindrical body is located above said inflow end.

* * * * *

UNITED STATES PATENT AND TRADEMARK OFFICE
CERTIFICATE OF CORRECTION

PATENT NO. : 4,662,908
DATED : May 5, 1987
INVENTOR(S) : RYUSHI SUZUKI et al

It is certified that error appears in the above-identified patent and that said Letters Patent are hereby corrected as shown below:

ON THE TITLE PAGE, ASSIGNEE SHOULD READ
--[73] Assignee: ISHIKAWAJIMA-HARIMA JUKOGYO KABUSHIKI KAISHA --.

Signed and Sealed this

Second Day of February, 1988

Attest:

DONALD J. QUIGG

Attesting Officer     Commissioner of Patents and Trademarks